United States Patent [19]

Karg et al.

[11] Patent Number: 5,848,659
[45] Date of Patent: Dec. 15, 1998

[54] NON-RAILBOUND VEHICLE WITH AN ELECTRIC MOTOR

[75] Inventors: Erich Karg, Detter; Dieter Lutz, Schweinfurt, both of Germany

[73] Assignee: Mannesmann Aktiengesellschaft, Düsseldorf, Germany

[21] Appl. No.: 448,421
[22] PCT Filed: Aug. 9, 1993
[86] PCT No.: PCT/DE94/00250
 § 371 Date: Jul. 13, 1995
 § 102(e) Date: Jul. 13, 1995
[87] PCT Pub. No.: WO94/22689
 PCT Pub. Date: Oct. 13, 1994

[30] Foreign Application Priority Data

Apr. 2, 1993 [DE] Germany .......................... 43 11 230.7

[51] Int. Cl.⁶ .................................................. B60K 1/00
[52] U.S. Cl. ..................... 180/65.4; 180/65.2; 180/65.3; 180/65.8; 180/69.3
[58] Field of Search ................... 180/65.3, 65.4, 180/65.5, 65.8, 69.3, 65.2

[56] References Cited

U.S. PATENT DOCUMENTS

| 3,477,537 | 11/1969 | Plishner | 180/65.4 |
|---|---|---|---|
| 3,837,419 | 9/1974 | Nakamura | 180/65.4 |
| 4,218,624 | 8/1980 | Schiavone | 180/65.3 |
| 4,318,449 | 3/1982 | Salisbury | 180/65.4 |
| 4,749,935 | 6/1988 | Osborne | 322/8 |
| 4,953,646 | 9/1990 | Kim | 180/65.4 |
| 5,081,365 | 1/1992 | Field et al. | 290/45 |
| 5,166,584 | 11/1992 | Fukino et al. | 180/65.3 |
| 5,212,431 | 5/1993 | Origuchi et al. | 180/65.4 |
| 5,214,358 | 5/1993 | Marshall | 180/65.4 |

FOREIGN PATENT DOCUMENTS

| 873573 | 6/1971 | Canada | 180/65.4 |
|---|---|---|---|
| 2517110 | 10/1975 | Germany | 180/65.4 |
| WO 93/23263 | 11/1993 | WIPO | 180/65.4 |

*Primary Examiner*—Eric D. Culbreth
*Attorney, Agent, or Firm*—Cohen, Pontani, Lieberman & Pavane

[57] ABSTRACT

A non-railbound vehicle with an electric motor in which the maximum output of the internal combustion engine will be available in its entirety for driving the vehicle without prejudice to convenience with respect to electrical actuation of accessory functions. The vehicle includes a drive control that provides a portion of the output generated by a generator for supplying power to the low-voltage vehicle power supply. The electronic drive control is programmed to provide a temporary interruption of the current supplied by the generator to the low-voltage vehicle power supply during operating phases in which the full output of the internal combustion engine is required for driving the vehicle. During these phases current is supplied to accessory electrical consumers via the vehicle battery.

12 Claims, 2 Drawing Sheets

NON-RAILBOUND VEHICLE WITH AN ELECTRIC MOTOR

BACKGROUND OF THE INVENTION

The invention is directed to a non-railbound vehicle having at least one driving wheel coupled with an electric motor which is supplied with electric current via output electronics which are influenced by an electronic control. The current is generated by a generator that is coupled to an internal combustion engine and functions at an operating voltage in the medium-voltage range. A low-voltage power supply is also present for supplying power to the accessory electrical consumers of the vehicle, and includes a battery which is supplied with current obtained by transforming a portion of the mechanical energy generated by the internal combustion engine.

DESCRIPTION OF THE PRIOR ART

WO-A-9115378 discloses such an electrically driven vehicle as is described above. In this vehicle a portion of the output generated by the generator is supplied to the low-voltage power supply either by a separate winding in the generator or from a DC-voltage intermediate circuit via an inverter. A central control unit coordinates the distribution of power to the driving motors, wherein antilock system and antiskid system functions can be realized. However, the central control unit does not influence the supply of power to the low-voltage vehicle power.

U.S. Pat. No. 5,166,584 discloses an electric vehicle in which the power requirement for high energy consumers is reduced when maximum output is required for powering the driving motors of the vehicle.

WO-A-9115378 discloses an electric vehicle with the features contained in the preamble of claim 1, in which a portion of the output generated by the generator is supplied to the low-voltage power supply either by means of a separate winding in the generator or from the DC-voltage intermediate circuit via an inverter. A central control unit coordinates the distribution of power to the driving motors, wherein antilock system and antiskid system functions can be realized. However, the central control unit does not influence the supply of power to the low-voltage vehicle power supply.

U.S. Pat. No. 5,166,584 discloses an electric vehicle in which the power requirement for high-energy consumers is reduced when maximum output is required for the driving motors.

A drive system for non-railbound vehicles which are outfitted with an internal combustion engine whose output shaft is coupled with an electric generator is known from the publication "Vehicle transmissions—present and future [Getriebe in Fahrzeugen heute und morgan]" (VDI-Berichte 878, 1991, pages 611–622). The driving wheels of the vehicle are connected with electric driving motors which draw their driving power from the generator. Because of the comparatively high output required to drive the vehicle, the generator operates in the medium-voltage range (e.g., 650 volts). A low-voltage power supply (e.g., 12 or 24 volts) in the form of a suitable vehicle power supply with a vehicle battery is provided as is customary (also for safety reasons) for the secondary or accessory electrical consumers found in the vehicle such as interior and exterior illumination, ventilator motors, windshield defroster, passenger compartment heating system, electric window openers, etc. In addition, a vehicle of this type can also be outfitted with a storage for storing driving power, e.g., a short-term storage in the form of a flywheel storage coupled with an electric generator or a long-term storage in the form of an accumulator.

In conventional vehicles, the power supply for accessory electrical consumers is generally provided for by a small electric generator, also known as a dynamo, which is driven by the internal combustion engine. The dynamo also supplies the current required for charging the vehicle battery which is then available for supplying current to the accessory electrical consumers when the dynamo supplies insufficient current (low speed, many consumers turned on) or none at all (internal combustion engine not in operation).

It has already been mentioned in the publication VDI-Bericht 878 that the generator producing the current for the electric driving motors can take over the function of the dynamo. However, no further details are given.

In order to be able to power the low-voltage vehicle power supply from the generator, the medium voltage (over 60 volts) produced by the generator must first be stepped down to low voltage for the supplied current. This transformation presents no difficulties in an AC generator. This is also true for generators supplying a pulsed DC current. Suitable electronic DC-DC converters are known for this purpose.

The challenge faced by the future development of non-railbound vehicles, particularly with respect to drive technology, consists in appreciably reducing the specific consumption values, that is, in ensuring the most effective possible use of the energy that is chemically combined in the fuel when converting this energy into driving power. In order to achieve high efficiency in the internal combustion engine and to make the vehicle as lightweight as possible, the effort is made to build the internal combustion engine so as to be as small as possible. In doing so, there is a tendency to reduce the output of the internal combustion engine. Therefore, in the future, maximum engine output will be perceptibly closer to the average required driving output than is presently the case in conventional vehicles.

This development conflicts with another development toward increased energy consumption in the vehicle. The number of accessory electrical consumers is constantly increasing, since an increasing number of functions are realized electrically (e.g., sun roof, seat adjustment, mirror adjustment, air conditioning, etc.). This has already led to a higher-output dynamo in conventional vehicles or even to simultaneous operation of two dynamos. Not only does this result in the disadvantage of heavy units, but a relatively poor energy conversion efficiency must also be taken into account. For instance, in order to generate an electrical output of 1.5 kW, a mechanical drive output in the order of magnitude of 3–5 kW is required, depending on speed. Thus, in an internal combustion engine with 50 kW output, this already comprises up to 10% of the theoretically available drive output. However, particularly for reasons of safety (e.g., kickdown when passing vehicles), it is desirable to have as much as possible of the maximum output of the internal combustion engine available for driving the vehicle.

SUMMARY OF THE INVENTION

The object of the present invention is to modify a vehicle of the generic type at the lowest possible cost in such a way that its specific fuel consumption remains as low as possible and, when required, the maximum possible output of the internal combustion engine is fully available for driving the vehicle without prejudice to convenience with respect to the actuation of accessory electrical functions.

Pursuant to this object, and others which will become apparent hereafter, one aspect of the present invention resides in a non-rail bound vehicle in which the electronic control provides a portion of the output generated by the generator for powering the low-voltage vehicle power supply. Additionally, the electronic control is operative to temporarily interrupt the current feed from the generator to the low-voltage vehicle power supply during operating phases in which the full output of the internal combustion engine is required for driving the vehicle. During these phases the current is supplied to the accessory electrical consumers by substituting in the vehicle battery.

The invention is applicable regardless of the type of device used as the generator (e.g., with permanent excitation or field excitation, with or without electronic commutation) or as the electric driving motor (e.g., synchronous, asynchronous or DC motor). It provides, first, that the electrical current required in the vehicle as driving power and for the accessory consumers is generated only by the electric generator coupled with the driven shaft of the internal combustion engine, that is, no separate dynamo is used. This not only economizes on weight in an advantageous manner, but is also advantageous in that the generator is enabled to generate current at an appreciably higher efficiency than was previously conventional in dynamos. The use of a so-called "generator step-up drive" as is sometimes needed to achieve sufficiently high speeds in the dynamo at low internal combustion engine speeds is dispensed with entirely. All of this contributes to maintaining a low specific fuel consumption of the vehicle. Additionally, the costs required for this purpose are small. Essentially, only a voltage transformer is required for transforming the current required for the accessory electrical consumers and for charging the vehicle battery from the originally generated medium voltage (preferably around 60 to 1500 volts, in particular in the range of 650 volts) to the low voltage of the vehicle power supply (e.g., 12 or 24 volts).

A particularly important feature of the invention consists in that the electronic control which is already present in the vehicle and which influences the operation of the internal combustion engine, generator and electric motors for the vehicle drive depending on the driving output demanded by the driver is expanded in such a way that a circuit is activated in operating phases in which the power requirement is particularly high (e.g., kickdown), that is, at or near the theoretical maximum output, which circuit temporarily interrupts the current supplied by the generator in the low-voltage vehicle power supply and ensures the supply of current to the accessory electrical consumers from the vehicle battery by way of substitution. In such phases, which are only of short duration as a rule, the maximum possible output of the internal combustion engine is fully available for driving the vehicle without prejudicing convenience by switching off individual accessory consumers. Of course, the importance of the additional available output increases the lower the output at which the internal combustion engine is designed. These output reserves are mobilized to a great extent via software, that is, without large cost. Only a circuit which temporarily disconnects the low-voltage vehicle power supply from the generator power is required. When the maximum output requirement phase is at an end, the electronic control can again release the supply of power from the generator so that the vehicle battery can also be charged once more.

The generator can power the low-voltage vehicle power supply directly (via the voltage transformer). In a particularly advantageous manner, the invention can be constructed in such a way that the voltage transformer for powering the low-voltage vehicle power supply draws current from an intermediate circuit, in particular a DC-voltage intermediate circuit, which is arranged downstream of the generator, the current for the electric driving motors also being drawn from this intermediate circuit.

Since the necessary components for carrying out the invention are in a working connection with the rest of the system via electric lines, they may be freely accommodated in the vehicle. Thus, not only is it possible to economize on weight, but the weight distribution and utilization of space can also be optimized.

DETAILED DESCRIPTION OF THE PREFERRED EMBODIMENTS

Figure 1:
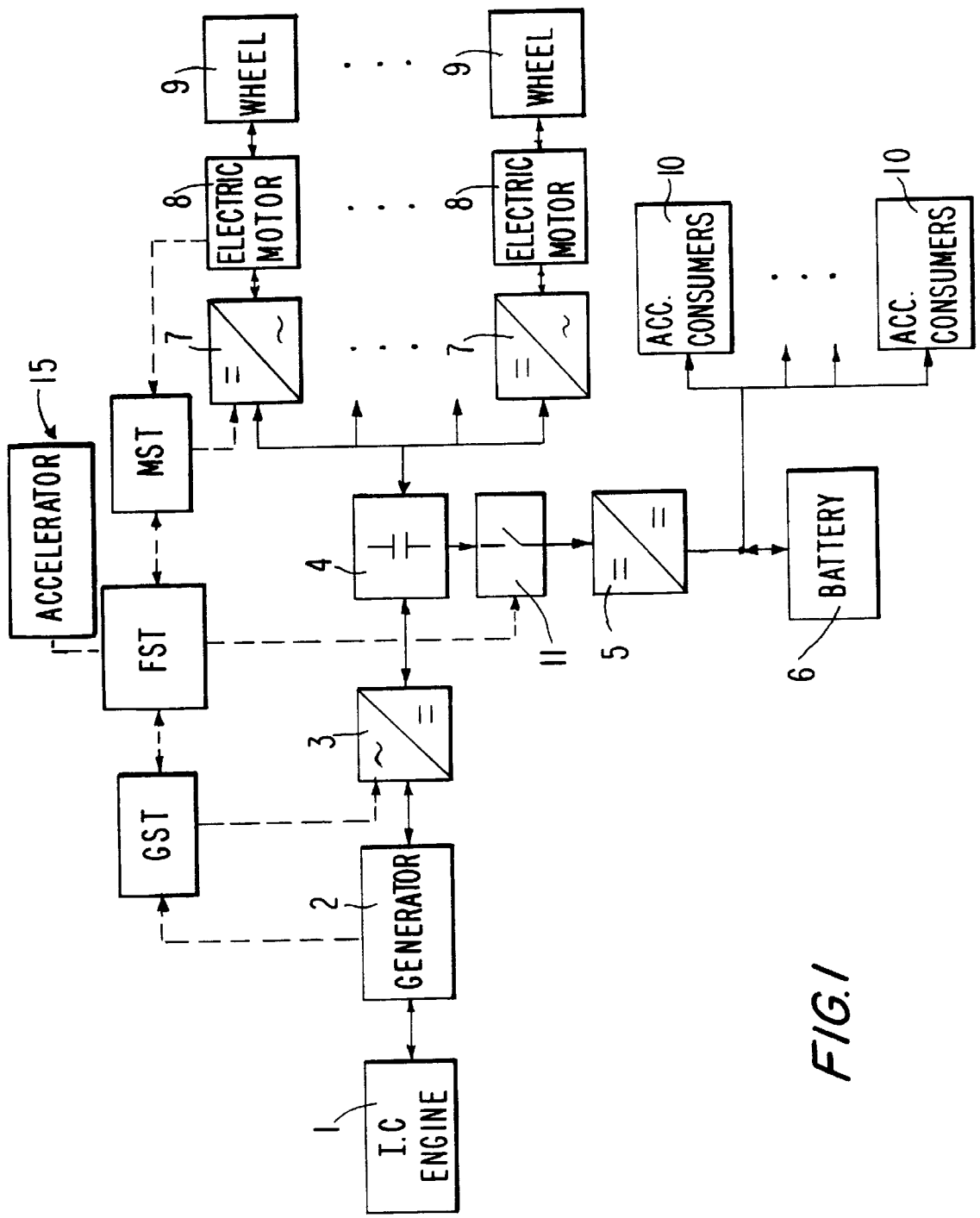
FIG. 1 is a block diagram of a drive train of a non-railbound vehicle pursuant to a first embodiment of the invention.

In FIG. 1, an internal combustion engine 1 is coupled via its crankshaft with a generator 2 which is constructed, for example, as a permanently excited DC generator with electronic commutation. The generator 2 produces alternating voltage which is fed to a DC-voltage intermediate circuit 4 after rectification in a rectifier 3. The driving power for operating the electric motors 8 which are, for instance, coupled with a wheel 9 of a vehicle (not shown) is drawn from the DC-voltage intermediate circuit 4. Like the generator 2, the electric motors 8 are preferably constructed as permanently excited DC generators with electronic commutation. The electric current is supplied to the electric motors 8, e.g., as alternating current (block 7). The electronic control that controls the generator 2 is designated by GST, while the electronic controls of the electric motors 8 are designated by MST, although only one of the latter is shown by way of example. An overriding drive control FST is superimposed on the controls for the electric motors 8 and generator 2. A driver selects the desired output by way of a conventional accelerator 15. The signal flow is shown in dashed lines to distinguish it from the power flow. The operating voltage in the DC-voltage intermediate circuit 4 lies in the medium-voltage range, preferably at approximately 650 volts. In addition to the electric motors 8, accessory electrical consumers 10 (e.g., ventilators, windshield defroster, etc.) in the vehicle must also be supplied with current. For this purpose, a low-voltage vehicle power supply, e.g., 12 or 24 volts, containing a vehicle battery 6 is provided. In order to charge the battery 6 and/or to power the accessory consumers 10 in normal driving operation the required current is removed from the DC-voltage intermediate circuit 4. Since the voltage level of the DC-voltage intermediate circuit 4 is essentially too high, the voltage is stepped down to the range of the vehicle power supply voltage in an electronic transformer 5. In operating phases in which the highest possible output should be available for driving the vehicle, the electronic control FST temporarily interrupts the connection between the DC-voltage intermediate circuit 4 and the voltage transformer 5 by means of a switching device (interrupter 11) so that all of the current generated by the generator 2 can be supplied to the electric motors 8. During these phases, the accessory consumers 10 are supplied uninterruptedly via the vehicle battery 6. When high output is no longer required (e.g., upon completion of a passing maneuver), the connection between the DC-voltage intermediate circuit 4 and the voltage transformer 5 is restored by the electronic control FST so that the battery 6 can be charged again and/or the accessory consumers 10 can be supplied directly from the DC-voltage intermediate circuit 4.

Figure 2:
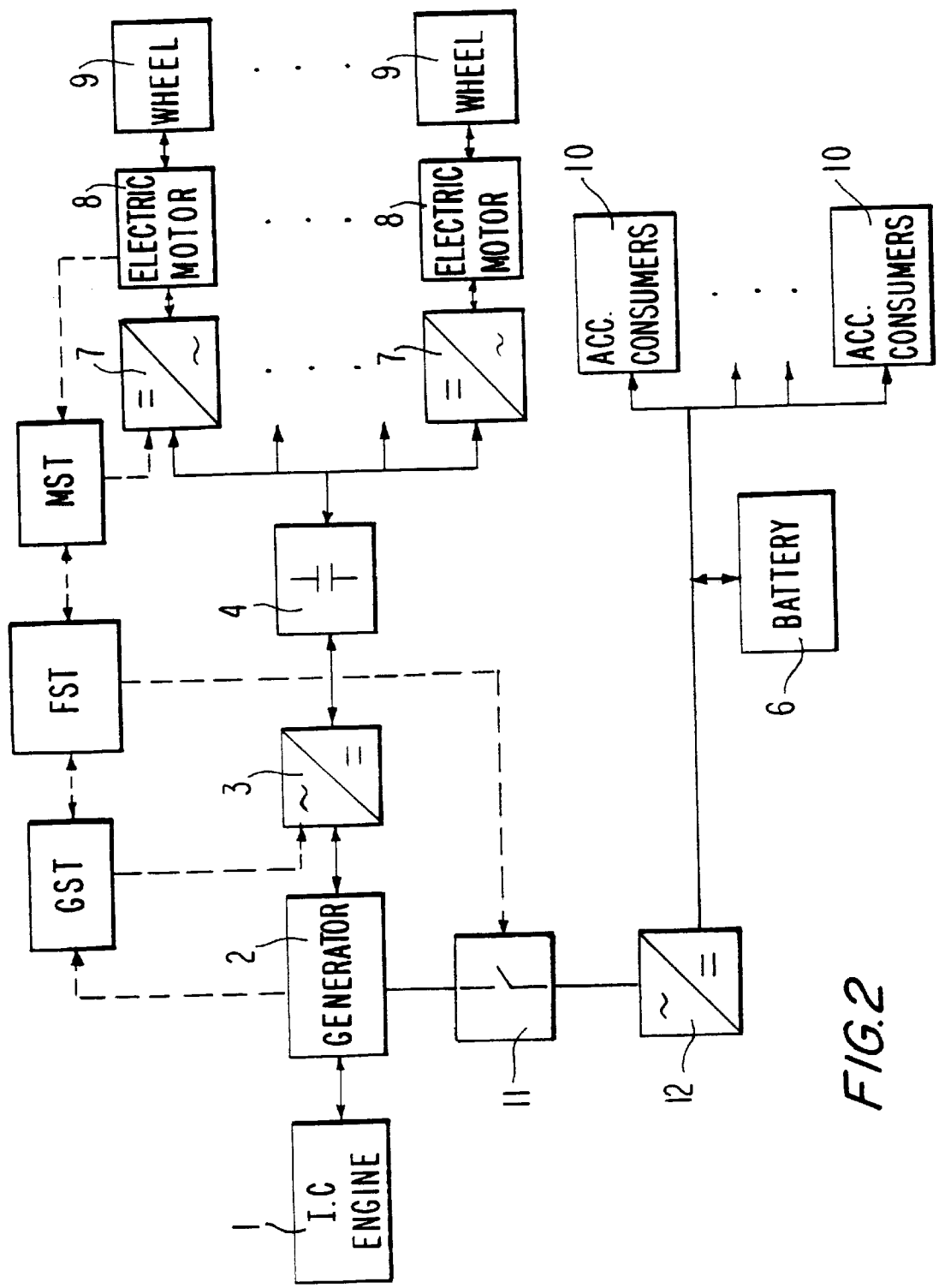
FIG. 2 is a block diagram similar to FIG. 1 of a second embodiment of the invention.

Of course, rather than drawing current from the DC-voltage intermediate circuit 4, it is also possible to branch off the current for the accessory consumers 10 from the generator 2 as is shown in FIG. 2. A voltage transformer 12 is provided for transforming the voltage to the level of the low-voltage vehicle power supply by stepping down and rectifying the alternating voltage of the generator 2. The voltage transformer 5 shown in FIG. 1 is dispensed with in this case. In other respects, the operation of the construction according to FIG. 2 conforms to that shown in FIG. 1 and need not be discussed again.

The generator 2 may also be outfitted with a suitable special device (e.g., a special low-voltage winding or circuit) for supplying power directly to the low-voltage vehicle power supply, thus dispensing with a stepping down of voltage (blocks 5 and 12). When increased driving output is required, the drive control FST interrupts the power supply to the low-voltage vehicle power supply in this case also.

The principle according to the invention can also be readily applied when using AC generators and AC motors. Of course, rectification must then be effected before feeding to the vehicle power supply. The advantages achieved in making available the maximum output of the internal combustion engine as driving power without loss of convenience in dispensing with a separate dynamo are still retained.

We claim:

1. A series hybrid vehicle, comprising:
   at least one driving wheel;
   an electric motor drivingly coupled to the at least one driving wheel;
   means for supplying electric current to the electric motor;
   electronic control means for influencing the electric current supply means;
   an internal combustion engine coupled to the electric motor by the electronic control means;
   a generator operatively coupled to the internal combustion engine for generating the electric current as an output with an operating voltage in a medium-voltage range;
   accessory electric consumers; and
   vehicle power supply means operative in a low-voltage range for supplying power to the accessory electric consumers, the vehicle power supply means including a battery, the electronic control means including a drive controller which is operative to direct a portion of the generator current output to the vehicle power supply means and is further operative to temporarily interrupt the current fed to the vehicle power supply means when full output of the internal combustion engine and generator is needed to drive the vehicle and temporarily connect the accessory electrical consumers to the battery.

2. A vehicle as defined in claim 1, and further comprising an accelerator operatively connected to the electronic control means so as to permit actuation of the electronic control means by a driver of the vehicle.

3. A vehicle as defined in claim 1, wherein the generator is operative to generate an electric current with an operating voltage in a range of above 100 volts to 1500 volts.

4. A vehicle as defined in claim 1, wherein the vehicle power supply means is operative in a range below 60 volts.

5. A vehicle as defined in claim 1, and further comprising interruption means operatively connected to the drive controller for temporarily interrupting the current feed from the generator to the low-voltage vehicle power supply means.

6. A vehicle as defined in claim 5, and further comprising voltage transformer means for reducing the current supply for the low-voltage vehicle power supply from the medium-voltage range of the generator to the voltage of the low-voltage vehicle power supply means, the voltage transformer means being connected directly to the generator via the interrupter means.

7. A vehicle as defined in claim 1, and further comprising voltage transformer means for reducing the current directed to the low-voltage vehicle power supply means from the medium-voltage range of the generator to the voltage of the low-voltage power supply means.

8. A vehicle as defined in claim 7, and further comprising a rectifier operatively arranged down stream of the generator for generating direct current, and a DC-voltage intermediate circuit operatively connected down stream of the rectifier to supply the electric motor with current for driving the vehicle, the voltage transformer means including a DC-DC converter connected to the DC-voltage intermediate circuit.

9. A vehicle as defined in claim 8, wherein the DC-voltage intermediate circuit is rated at an operating voltage in a range of 60 to 1500 volts.

10. A vehicle as defined in claim 9, wherein the DC-voltage intermediate circuit is rated at an operating voltage of approximately 650 volts.

11. A vehicle as defined in claim 1, wherein the generator includes means for supplying power directly to the low-voltage vehicle power supply means.

12. A vehicle as defined in claim 11, wherein the means for supplying power directly to the low-voltage power supply means includes a low-voltage winding.

* * * * *